United States Patent
Chu et al.

(10) Patent No.: US 8,437,333 B2
(45) Date of Patent: May 7, 2013

(54) CONTENTION BASED PERIOD BEAMFORMING

(75) Inventors: Liwen Chu, San Ramon, CA (US);
George A. Vlantis, Sunnyvale, CA (US);
Vincenzo Scarpa, Lecce (IT)

(73) Assignees: STMicroelectronics, Inc., Coppell, TX (US); STMicroelectronics Srl, Agrate Brianza (MI) (IT)

( * ) Notice: Subject to any disclaimer, the term of this patent is extended or adjusted under 35 U.S.C. 154(b) by 352 days.

(21) Appl. No.: 12/830,544

(22) Filed: Jul. 6, 2010

(65) Prior Publication Data
US 2012/0008603 A1  Jan. 12, 2012

(51) Int. Cl.
*H04J 3/06* (2006.01)
(52) U.S. Cl.
USPC .......................................................... 370/350
(58) Field of Classification Search .......... 370/328–339; 455/13.3, 63.3, 63.4, 562.1, 575.7
See application file for complete search history.

(56) References Cited

U.S. PATENT DOCUMENTS

| 6,233,466 | B1 * | 5/2001 | Wong et al. ................. 455/562.1 |
| 7,551,135 | B2 * | 6/2009 | Uno et al. ...................... 342/367 |
| 8,095,069 | B2 * | 1/2012 | Maltsev et al. .............. 455/41.2 |
| 2010/0056062 | A1 | 3/2010 | Zhang et al. |
| 2010/0214169 | A1 * | 8/2010 | Kafle ............................. 342/368 |
| 2010/0215027 | A1 * | 8/2010 | Liu et al. ....................... 370/338 |

* cited by examiner

*Primary Examiner* — Frank Duong
(74) *Attorney, Agent, or Firm* — Hogan Lovells US LLP

(57) ABSTRACT

Contention based period beamforming includes the establishment of synchronized communications between a beamforming initiator and a beamforming responder to precisely define a start time for beamforming training. Synchronization between the beamforming initiator and beamforming responder begins with the sending of control information to the responder so that the start of the beamforming process will be synchronized. With beamforming training synchronized, beamforming is initiated using the sector sweep process.

17 Claims, 4 Drawing Sheets

CONTENTION BASED PERIOD BEAMFORMING

BACKGROUND OF THE INVENTION

1. Field of the Invention

Embodiments of the present invention relate, in general, to beamforming and more particularly to beamforming in wireless communication networks.

2. Relevant Background

Beamforming is a signal processing technique used with one or more transmitters or receivers to control the directionality of, or sensitivity to, a radiation pattern. When receiving a signal, beamforming can increase gain in the direction of wanted signals and decrease gain in the direction of interference and noise. When transmitting a signal, beamforming can increase gain in the direction the signal is to be sent. This is done by creating beams and nulls in the radiation pattern. Beamforming can also be thought of as a spatial filter.

An ever increasing number of relatively inexpensive, low-power wireless telecommunications services, networks and devices made available over the past number of years promise near wire speed transmission and reliability. Various wireless technology of this type are described in detail in the 802 series Institute of Electrical and Electronics Engineers (IEEE) standards, its updates and amendments.

Wireless networks, such as a wireless personal area network (WPAN) and wireless local network (WLAN), involve the interconnection of devices that are not necessarily physically linked together. The interest and demand for particularly high data rates in such networks has significantly increased. One approach to realize high data rates in any WPAN/WLAN is to utilize the unlicensed 60 GHz band.

In general, antennas are highly directional at frequencies near or above 60 GHz. When multiple antennas are available at a transmitter, receiver, or both, it is therefore important to apply efficient beam patterns to the antennas to better exploit spatial selectivity of the corresponding wireless channel. Generally speaking, beamforming or beam-steering creates a spatial gain pattern having one or more high gain lobes as compared to the gain obtained by an omnidirectional antenna. If the gain pattern for multiple transmit antennas, for example, is configured to produce high gain lobe in the direction of the receiver better transmission reliability can be obtained over that which can be obtained by an omnidirectional transmission.

FIG. 1 depicts a beamformed antenna pattern as is known to one of reasonable skill in the art. As is shown, 3 wireless devices form a personl area network. A first device 110 communicates to a second device 120 through an access point 105. The first device 110 includes an omnidirectional antenna with the range as depicted 115. Similarly, the second device includes an omnidirectional antenna extending beyond the access point 105. Note that the range of the first device 115 intersects with the range of the second device 125, both of which encompass the access point 105. Thus, the antenna device 110 must be correctly directioned in order to directly communicate to the second device 120.

Also depicted in FIG. 1 is one possible pattern of beamforming, as illustrated with reference to the second device 120. By concentrating energy in one specific direction, the overall range of the omnidirectional antenna is extended by sacrificing range in different directions. Thus, as shown in FIG. 1, the range of the directional antenna 130 related to the second device 120 can extend beyond and encompass the first device 110. Also shown in FIG. 1 are two side lobes 140 which extend from the second device 120. While in this depiction only one main beam 130 and two side lobes 140 are shown, one of reasonable skill in the art will recognize that associated with the main beam 130 are an infinite number of side lobes 140, each of which have different and decreasing intensities. In between each side lobe is a region of diminished or zero transmission, which is called a null region 150. Thus, as each station can form its own directional beam, the first device 110 can directly communicate with the second device 120 without utilizing the access point 105.

One method of beamforming in a communication system includes applying different steering vectors for the antenna to generate a plurality of quality indicators. As the antenna sweeps through a plurality of sectors, quality data is collected to determine which sector produces the best transmission quality. The underlying assumptions to use this technique to identify the best beam are that the two stations are synchronized, and unfettered communication between the two stations exist. Unfortunately, these situations rarely occur. When beamforming occurs between two stations in a wireless area network that are not synchronized, one or more sectors of the antenna sector sweep may be missed. Accordingly, the beamforming process may omit the highest quality sector when establishing the communication beam between two communicating stations. These and other challenges of the prior art are addressed by one or more embodiments of the present invention.

SUMMARY OF THE INVENTION

A method and system of contention based period beamforming includes the establishment of synchronized communications between a beamforming initiator and beamforming responder to precisely define a start time for beamforming training. According to one embodiment of the present invention, synchronization between the beamforming initiator and beamforming responder begins with the sending of control information to the responder so that the start of the beamforming process will be synchronized. With beamforming training synchronized, beamforming is initiated using the sector sweep process.

According to one aspect of the present invention, the beamforming initiator sends a beamforming request message to the beamforming responder. In some cases the beamforming request message is relayed to the beamforming responder through a personal basic service set coordination point or access point. Once the beamforming responder has received a request, the beamforming responder, using a directional/omnidirectional antenna, transmits a response message back to the initiator through a personal basic service set coordination point or access point. With communications synchronized, the beamforming initiator starts a sector sweep transmission to the beamforming responder.

According to another embodiment of the present invention, synchronization between the beamforming initiator and beamforming responder can be acquired through two sector sweep beamforming stages; the first stage sector sweep is used to synchronize the beamforming initiator and beamforming responder, and the second stage beamforming is initiated using the sector sweep process.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein.

Figure 1:
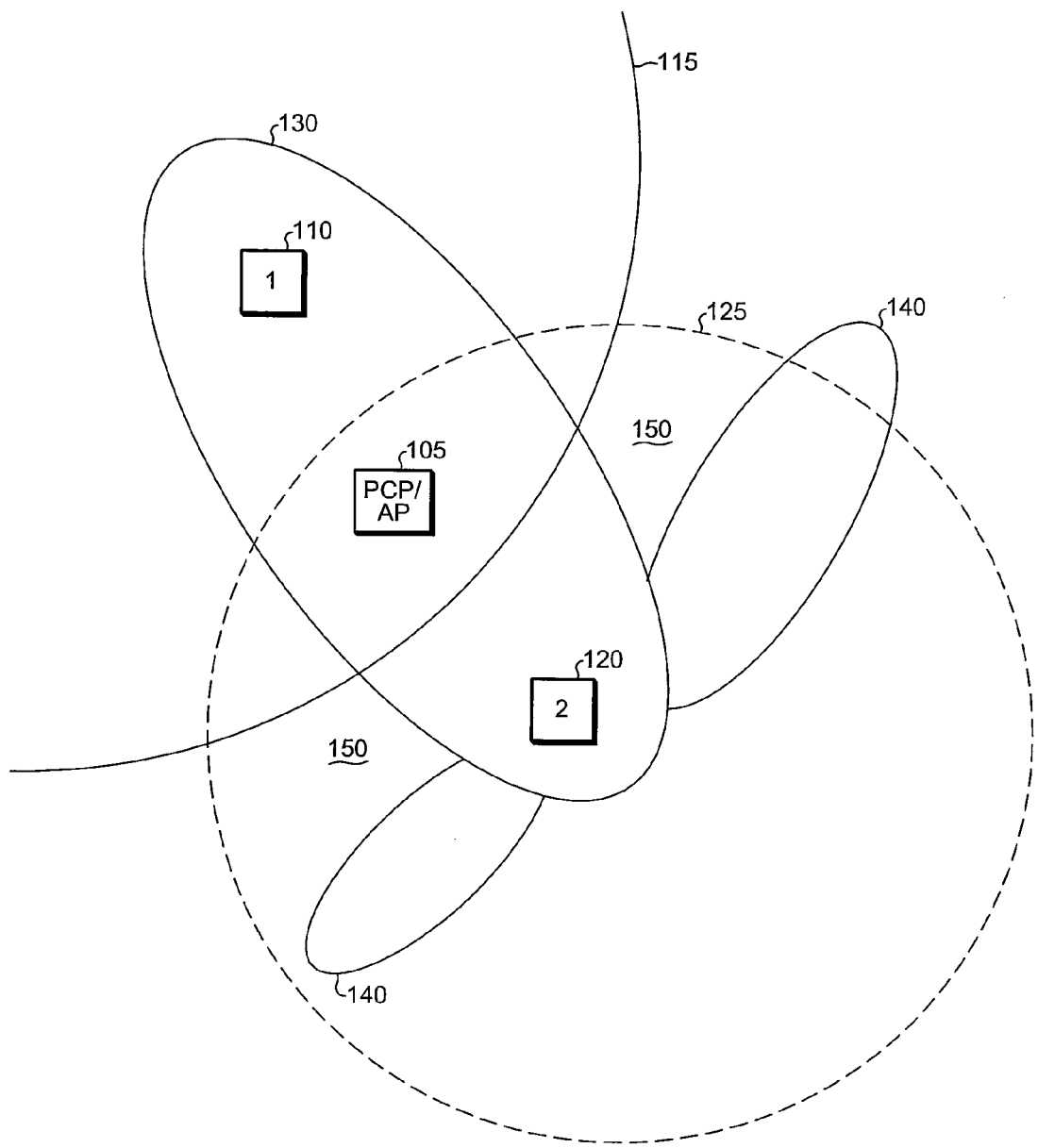
FIG. 1 shows a personal wireless communications network with overlapping omnidirectional antenna coverage and select beam formed antenna coverage as would be known to one of reasonable skill in the art.

The Figures depict embodiments of the present invention for purposes of illustration only. One skilled in the art will readily recognize from the following discussion that alternative embodiments of the structures and methods illustrated herein may be employed without departing from the principles of the invention described herein.

DESCRIPTION OF THE INVENTION

Beamforming in a wireless communication network during a contention based period is divided into two stages. First, communications between a beamforming initiator and a beamforming responder are synchronized. Second, once the two stations are synchronized, sector sweep beamforming begins with a precisely defined start time. Should the beamforming process not be complete by the end of the transmission opportunity, the beamforming (sector sweep) is continued without a back-off period in communication priorities.

Embodiments of the present invention are hereafter described in detail with reference to the accompanying Figures. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

The following description with reference to the accompanying drawings is provided to assist in a comprehensive understanding of exemplary embodiments of the present invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purposes only and not for the purpose of limiting the invention as defined by the appended claims and their equivalents.

It is to be understood that the singular forms "a," "an," and "the" include plural references unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The IEEE 802.11 standard provides two mechanisms for a wireless station to access the shared wireless communication medium. These two mechanisms are a contention free arbitration mechanism and a contention based arbitration mechanism.

The contention free arbitration mechanism utilizes a point coordinator function (PCF) to control access to the shared communications medium. When a PCF is established, the PCF polls registered wireless stations for communications and provides communication medium access to the stations based on the results of this polling. Thus, the PCF may prioritize messages within the stations which are included in the polling sequence. For a wireless station to be included in the PCF polling sequence, the wireless station must support PCF operations and must make itself known to the PCF. Another contention free mechanism that may integrated to 802.11 standard in 60 GHz band is the time reservation mechanism. The source and destination stations are in communication with each other during the specific time period without having to consider a back-off period. During such time period, the other stations in the BSS are not allowed to be in communication.

The contention based mechanism utilizes a random back-off period to provide fairness in accessing the shared communications medium. In the CBP, each station monitors the shared communications medium and determines if the medium has been silent for a predefined period of time. If so, each station waits a random amount of time longer and, when the communications medium is still silent, transmits its message on the medium.

Embodiments of the present invention describe a beamforming process using a CBP. CBP defines several methods by which to determine which station within the network can transmit frames in a transmit opportunity. A transmit opportunity (TXOP) within wireless networks is introduced by the IEEE 802.11e Quality of Service standard. Used in both Enhanced Distribution Channel Access (EDCA) and hybrid coordination function controlled channel access modes of operation, the TXOP is a bounded time interval in which stations supporting Quality of Service are permitted to transfer a series of frames. A TXOP is defined by a start time and a maximum duration.

CBP uses EDCA and Carrier Sense Multiple Access/Channel Access (CSMA/CA) to determine which station within a wireless network should transmit frames including frames that would support beamforming. According to one embodiment of the present invention, two control frames are added to support CBP beamforming.

Beamforming can be accomplished by a number of means. One such means of beamforming, which is the focus of the present invention, is sector sweeping. Sector sweeping involves communication between a beamforming initiator and a beamforming responder as various sectors of beams are swept through an area of interest. During the sector sweep process, various communication beams are tested to determine the highest quality of service. Upon finding the highest quality of service beam, that beam is identified as being the means for communication between the two stations.

In the typical beamforming process a responding station sets its antenna array in an omnidirectional mode to receive information from an initiator of a beamforming process. Once in this mode, the responding station can receive sector sweeping information transmitted from the initiator station to determine the highest transmitting sector for future communications. The first station, the initiator, transmits a series of training data units to identify different steering vectors for the beamforming. Shortly thereafter the initiating station transmits data which is received by the responding station. Quality of service of each training beam is measured and recorded. During this process the responding station may receive the entire or partial sequence and assess the quality of the data in the sequence. Thereafter the initiating station utilizes a different steering vector for transmitting training data to the responding station and accomplishes the procedure again.

Upon identifying the best received data, the responding station can send feedback to the initiating station prior to entering a transmission state between the two stations.

As noted above, one deficiency of the prior art is that, prior to initiating the beamforming process, there is no coordination or synchronization between the initiating station and the responding station. Thus, when the initiating station begins with the sector sweep process, the responding station may not be in an omnidirectional mode but instead may communicate with another station directionally and may thus miss or overlook one or more sectors or vector combinations that may exhibit the highest quality of service.

According to one embodiment of the present invention, the beamforming process is divided into two distinct steps. First, the initiator and responding station are synchronized so that at the time of beamforming initiation, communications between the initiator and responder are such that there is no loss of training data. Upon completion of this first synchronization step, the second step of the sector sweeping process of beamforming is accomplished, as would be known to one of reasonable skill in the relevant art.

Figure 2:
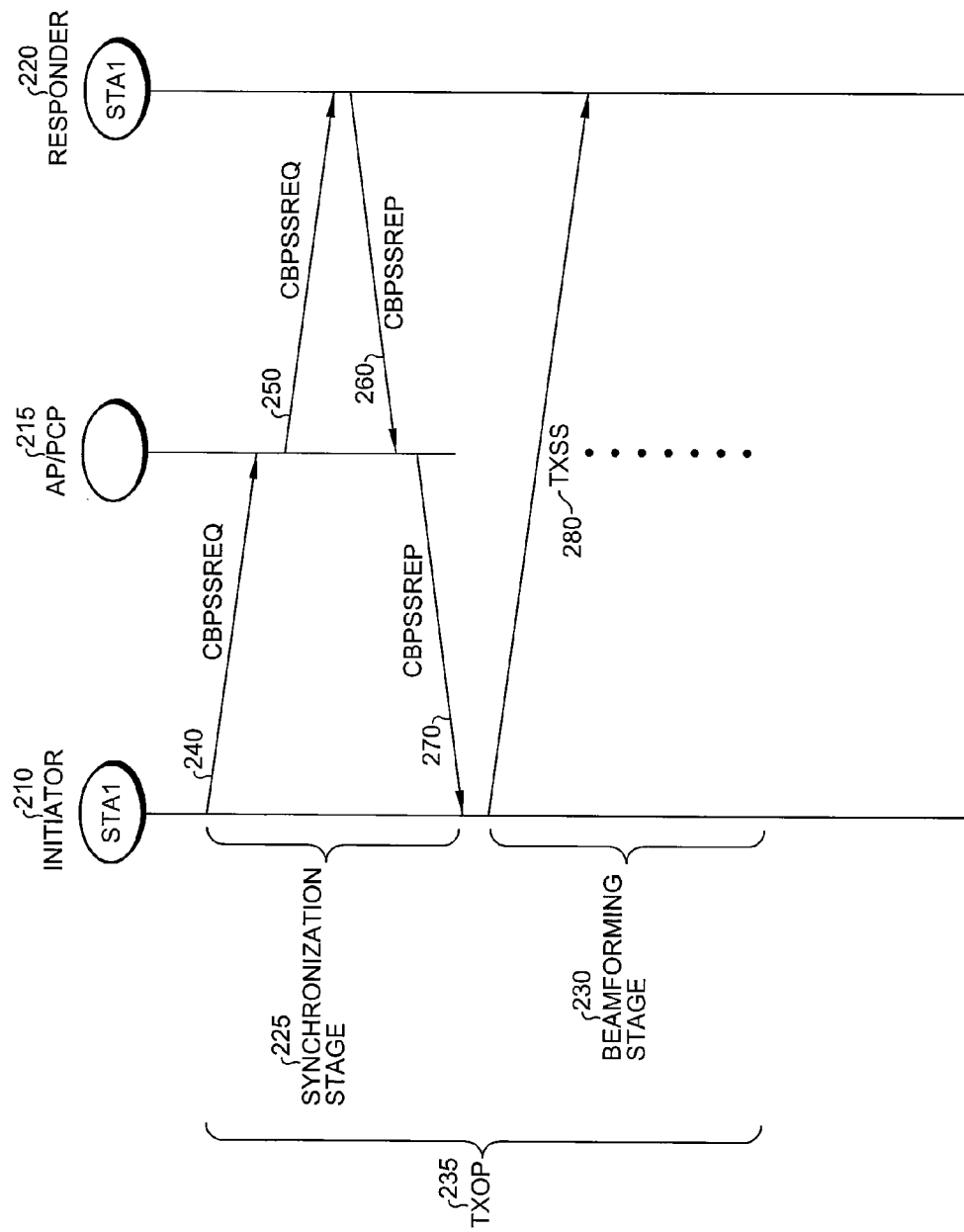
FIG. 2 is a communication process flowchart showing communication flow during the synchronization period of beamforming according to one embodiment of the present invention.

FIG. 2 depicts a communication flow of the exchange of data between an initiator and responding station in a CBP beamforming process. The initiator 210 begins the process by initiating a CBP sector sweep request 240 to the responding station 220. As there is no guarantee that the initiator station 210 is in direct communication with responding station 220, the communication request passes through the access point 215. The access point 215 therefore acts as a conduit of the CBP sector sweep request from the initiator 210 and responder 220.

Upon receiving the CBP sector sweep request 250 from the access point 215, the responding station 220 requires a CBP sector sweep response 260. Again at this stage, there is no guarantee that the responder 220 is in direct communication with the initiator 210. Therefore, the CBP sector sweep response 260, 270 is conveyed to the initiator 210 through the access point 215 so as to reach the initiator 210. At the completion of this initial exchange of information, the initiator 210 is synchronized with the responder 220 completing the synchronization stage 225.

Thereafter, the remainder of the transmission opportunity 235 is occupied by the beamforming stage 230 which includes various transmissions of sector sweep information 280.

As one of reasonable skill in the relevant art will recognize, the embodiments of the present invention support CBP beamforming between stations with single or multiple antenna subassemblies. As illustrated above, the embodiments of the present invention precisely define the start time for which the first beamforming training occurs by each peer station, with or without multiple antenna subassemblies, within the CBP.

According to another embodiment of the present invention, two-stage beamforming is accomplished in a CBP. In the first stage CBP, when the beamforming initiator starts to transmit a beamforming training frame, the beamforming responder can communicate with another station with its antenna working in a directional mode. Therefore, the beamforming responder may miss one or more beamforming training frames transmitted in one or more of the beamforming initiator's sectors. Indeed, one or more of the missed sectors may represent the highest quality of service. By extending the second-round beamforming procedure in the same CBP following the first-round of beamforming so that the sector sweep procedures occur consecutively, each sector sweep opportunity is examined to identify the highest quality of service between the initiator and responder. The second phase of beamforming can also be utilized without the previously described synchronization stage.

Figure 3:
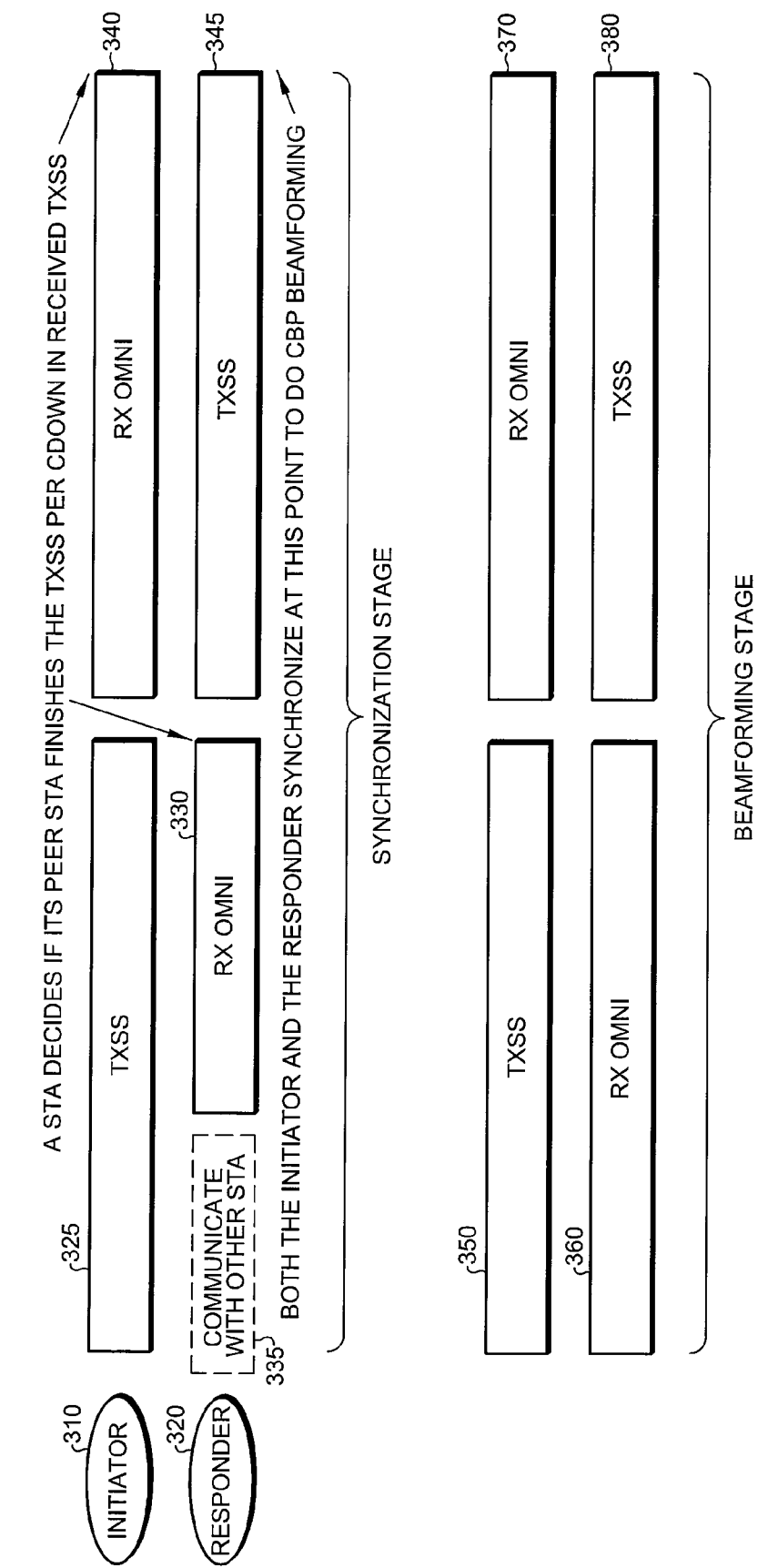
FIG. 3 is a high level representation of a (CBP) beamforming process according to one embodiment of the present invention wherein the initiator and responder are beamforming with a single antennae.

FIG. 3 is a high-level depiction of a beamforming process between an initiator and responder using a single antenna. As shown, the initiator 310 initiates a sector sweep 325 with the responder 320. The sector sweep transmission by the initiator 310 is received by an omnidirectional antenna of the responder 330. Significantly, the responder 320 receives the sector sweep transmission 325 after ceasing communications with another station 335. Thus, the sectors examined during the initial part of the sector sweep transmission 325 are not observed by the responder 320.

Upon completion of the sector sweep transmission 325 by the initiator 310, the responder 320 initiates its own sector sweep transmission 345. As the two stations are now aligned, the responder sector sweep transmission 345 is received by the initiator's omnidirectional antenna 340. At the completion of the responder 320 sector sweep transmission 345 and the initiator's reception of that transmission 340, the initiator 310 and responder 320 are synchronized.

Rather than ceasing beamforming operations and entering into a back-off period, according to one embodiment of the present invention, beamforming continues with the second stage or an extended beamforming operation. Again, the initiator 310 begins a sector sweep transmission 350 which is received 360 by the omnidirectional antenna of the responder 320. At the completion of the initiator's transmission 350 the responder 320 replies with the sector sweep transmission 380 that is received by the omnidirectional antenna 370 of the initiator 310. During the second beamforming stage, the initiator 310 and the responder 320 have transmitted and received a complete sector sweep beamforming process, enabling both stations to identify the highest quality of service position.

Figure 4:
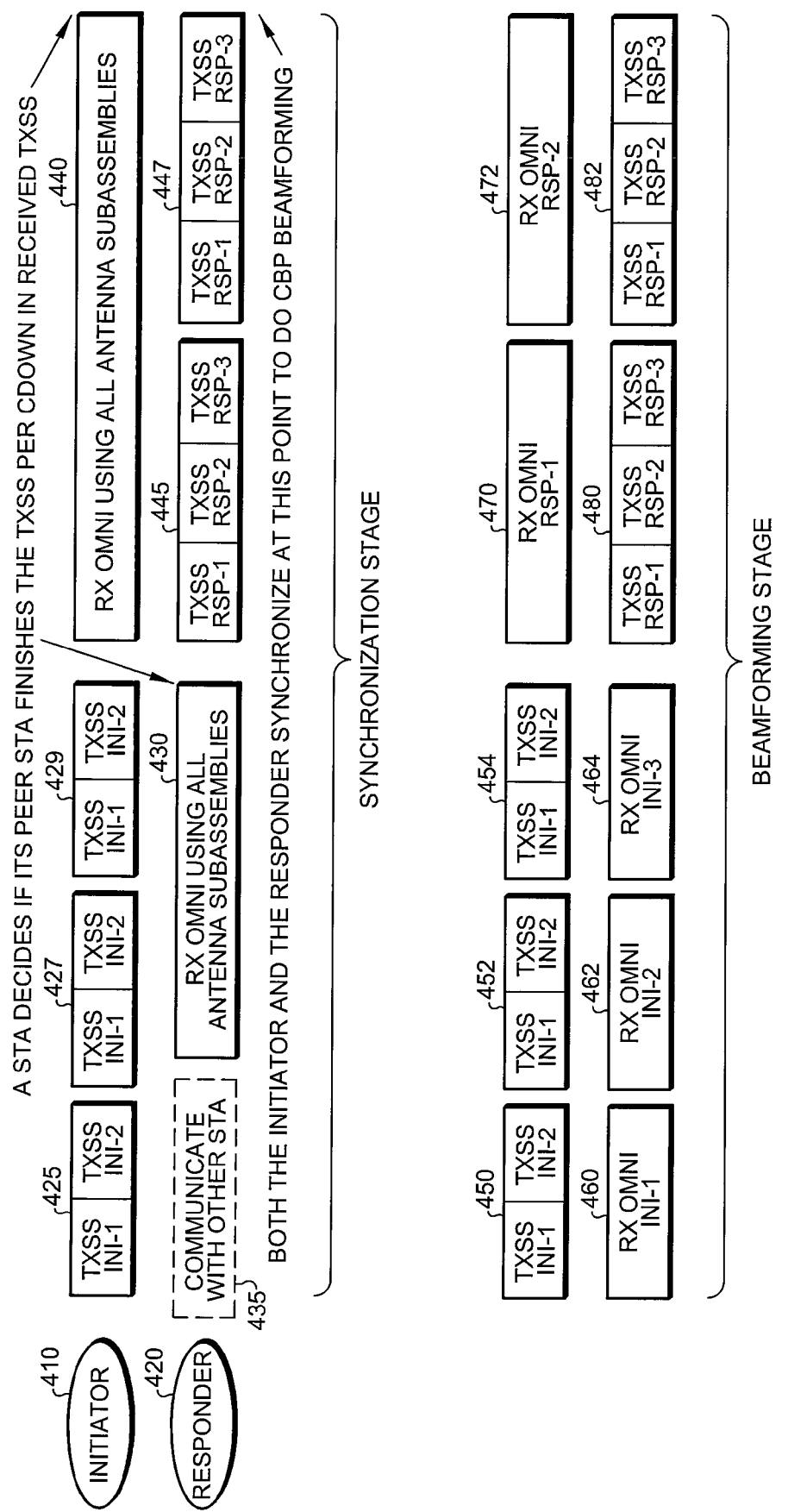
FIG. 4 is a high level representation of a CBP beamforming process according to one embodiment of the present invention wherein the initiator and responder are beamforming with multiple antenna.

The CBP beamforming process of the present invention can also be implemented with multiple antenna arrays. FIG. 4 is a high-level block diagram showing a beamforming process between an initiator 410 and a responder 420 involving multiple antennae. As was shown and described with respect to FIG. 3, FIG. 4 shows that the responder 420 is in communication with another station 435 at the initiation of the beamforming process. The initiator 410 initiates a sector sweep transmission 425, 427, 429 using, in this case, two antennae. In each instance, a particular sector is transmitted to responder 420 by the initiator 410 using both antennae. The responder 420, however, receives the transmission using all of its omnidirectional antenna subassemblies 430. Yet, as can be seen in FIG. 4, the first of the sector sweep transmission 425 is not observed by the responder 420, since it is in communication with another station 435. At the completion of the initiator's sector sweep transmission 425, 427, 429, the responder 420 initiates its response 445, 447 using its three antenna subassemblies. The responder's response is received by the initiator 410 using all of its antenna subassemblies 440.

At the completion of the first round of the sector sweep transmission, the initiator 410 and the responder 420 are synchronized. The second round of sector sweep transmissions constitute the beamforming stage between the initiator 410 and the responder 420. Again, according to one embodiment of the present invention, the initiator 410 and responder 420 can initiate a subsequent beamforming stage without experiencing a back-off period.

As in the first stage, the initiator 410 initiates three sector sweep transmissions 450, 452, 454 that is this time received by the individual omnidirectional antenna 460, 462, 464 of the responder 420. Similarly, the responder 420 replies with sector sweep transmissions of its own 480, 482 that are received by the respective omnidirectional antenna 470, 472 of the initiator 410.

The two-stage extension beamforming of the present invention guarantees that the beamforming responder can find the best transmit sector using its new or additional synchronization stage.

Included in the description are communication flowcharts depicting examples of the methodology which may be used to conduct CBP beamforming. It will be understood that each block or depiction of the flowchart illustrations, and combinations of blocks in the flowchart illustrations, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture, including instruction means, that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

As will be understood by those familiar with the art, the invention may be embodied in other specific forms without departing from the spirit or essential characteristics thereof. Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the claims.

While there have been described above the principles of the present invention in conjunction with CBP beamforming, it is to be clearly understood that the foregoing description is made only by way of example and not as a limitation to the scope of the invention. Particularly, it is to be recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

The invention claimed is:

1. A method for contention based beamforming in a wireless communications network which comprises a plurality of stations and an Access Point (AP), the method comprising:
   synchronizing a beamforming initiator station (BFIS) and a beamforming responder station (BFRS) during an initial synchronization stage; and
   responsive to the BFIS and the BFRS being synchronized, conducting beamforming training between the BFIS and the BFRS during a subsequent beamforming stage;
   wherein at the end of the synchronization stage communications between the BFIS and the BFRS are synchronized; and
   wherein the beamforming training stage comprises an initial substage during which the BFIS transmits a Transmit Sector Sweep (TXSS) signal that is received by the BFRS and a second substage during which the BFRS transmits a TXSS signal that is received by the BFIS.

2. The method according to claim 1 wherein the TXSS signals are transmitted using directional antennas and received using omnidirectional antennas.

3. The method according to claim 1 wherein the beamforming training stage follows the synchronization stage without an interim back-off period.

4. The method of claim 1 wherein the synchronization stage comprises relay signaling a beamforming request message from the BFIS to the AP and from the AP to the BFRS, and relay signaling a beamforming response message from the BFRS to the AP and from the AP to the BFIS; and wherein the beamforming request message and the beamforming response message synchronize the time of initiation of the beamforming stage.

5. The method of claim 4 wherein the synchronization stage and the beamforming stage are completed together in one transmit opportunity (TXOP).

6. The method of claim 1 wherein the synchronization stage comprises a first substage during which the BFIS transmits a TXSS signal and the BFRS receives the TXSS signal, and a subsequent substage in which the BFRS transmits a TXSS signal which is received by the BFIS, and wherein the BFIS and BFRS are synchronized at the conclusion of the second substage.

7. The method of claim 6 wherein during the synchronization stage, the BFIS and the BFRS determine the end of each substage using CDOWN values within the TXSS signals.

8. A system for contention based beamforming between two stations in a wireless communication system, comprising:
  a personal basic service set coordination point (PCP);
  a beamforming initiator station (BFIS); and
  a beamforming responder station (BFRS), wherein the BFIS initiates two-stage beamforming training with the BFRS;
  wherein the two-stage beamforming training comprises an initial synchronization stage and a subsequent beamforming stage;
  wherein at the end of the synchronization stage communications between the BFIS and the BFRS are synchronized; and
  wherein the beamforming stage comprises an initial substage during which the BFIS transmits a TXSS signal that is received by the BFRS and a second substage during which the BFRS transmits a TXSS signal that is received by the BFIS.

9. The system according to claim 8 wherein the two-stage beamforming occurs in a single transmission opportunity (TXOP).

10. The system of claim 8 wherein the synchronization stage comprises relay signaling a beamforming request message from the BFIS to the AP and from the AP to the BFRS, and relay signaling a beamforming response message from the BFRS to the AP and from the AP to the BFIS; and wherein the beamforming request message and the beamforming response message synchronize the time of initiation of the beamforming stage.

11. The system of claim 10 wherein the synchronization stage and the beamforming stage are completed together in one transmit opportunity (TXOP).

12. The system of claim 8 wherein the synchronization stage comprises a first substage during which the BFIS transmits a TXSS signal and the BFRS receives the TXSS signal, and a subsequent substage in which the BFRS transmits a TXSS signal which is received by the BFIS, and wherein the BFIS and BFRS are synchronized at the conclusion of the second substage.

13. The system of claim 12 wherein during the synchronization stage, the BFIS and the BFRS determine the end of each substage using CDOWN values within the TXSS signals.

14. A wireless device configured to perform contention based beamforming in a wireless communication network, comprising:
  at least one antenna capable of omnidirectional and directional transmitting and receiving;
  a machine capable of executing instructions embodied as software; and
  a plurality of software portions, wherein
    one of said software portions is configured to synchronize the wireless device with another wireless device in a basic service set of the wireless communication network,
    responsive to the wireless device and the another wireless device being synchronized, one of said software portions is configured to conduct beamforming training, and
  the beamforming training comprises an initial substage during which the wireless device transmits a Transmit Sector Sweep (TXSS) signal that is received by the another wireless device, and a second substage during which the another wireless device transmits a TXSS signal that is received by the wireless device.

15. The wireless device of claim 14 further comprising a basic service set coordination point with the basic service set and wherein one of said software portions is configured to relay beamforming requests and beamforming responses between the wireless device and the another wireless device through the basic service set coordination point.

16. The wireless device of claim 15 wherein beamforming requests are transmitted using directional antennas and received using omnidirectional antennas.

17. The wireless device of claim 14 wherein said software portions are configured to perform the synchronization stage and the beamforming stage in a single transmission opportunity without an interim back-off period.

* * * * *